Nov. 29, 1966     A. E. MARTENS     3,287,957
CALIBRATION UNIT
Filed Oct. 1, 1964
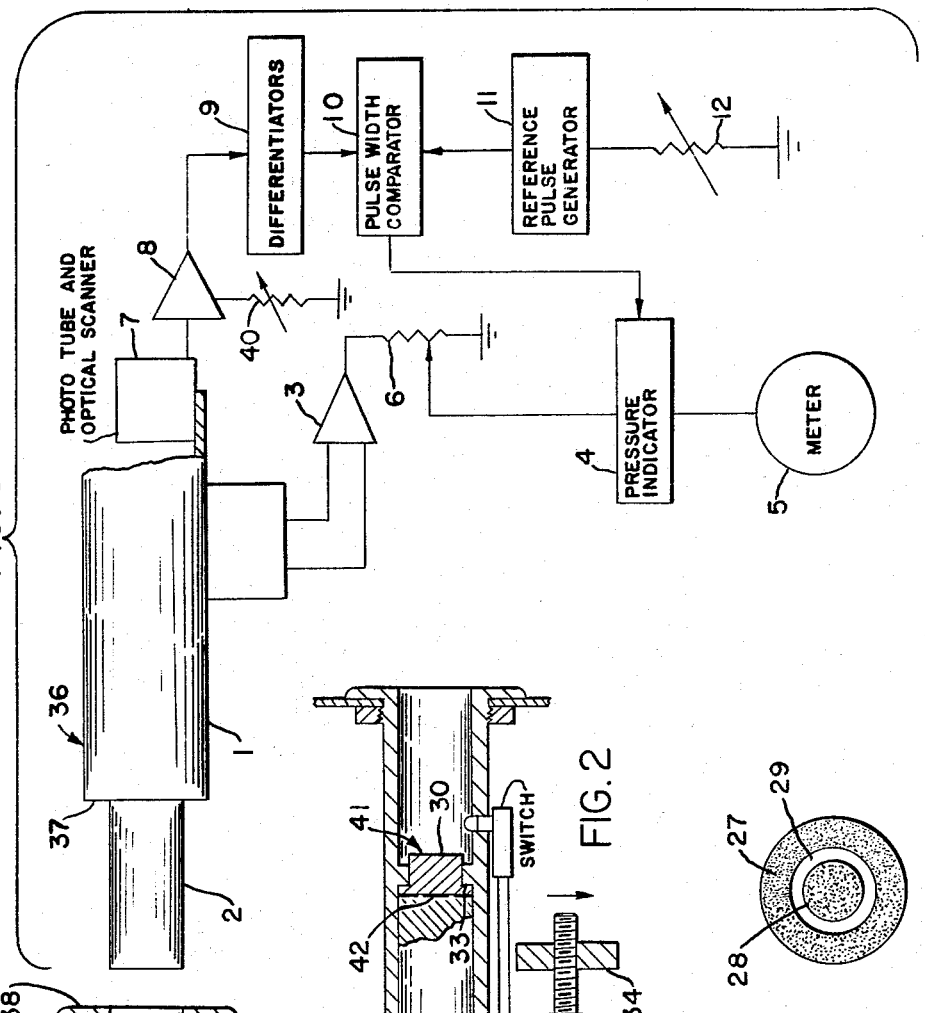
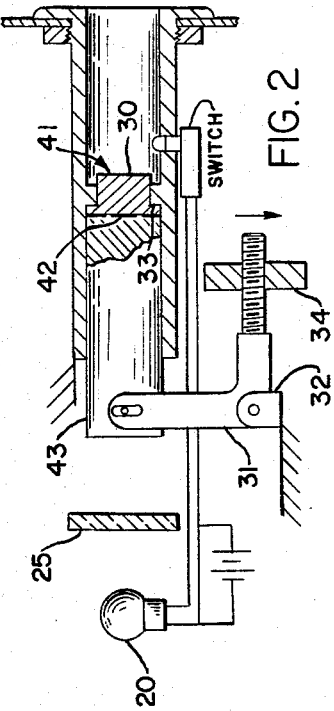
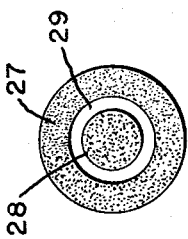
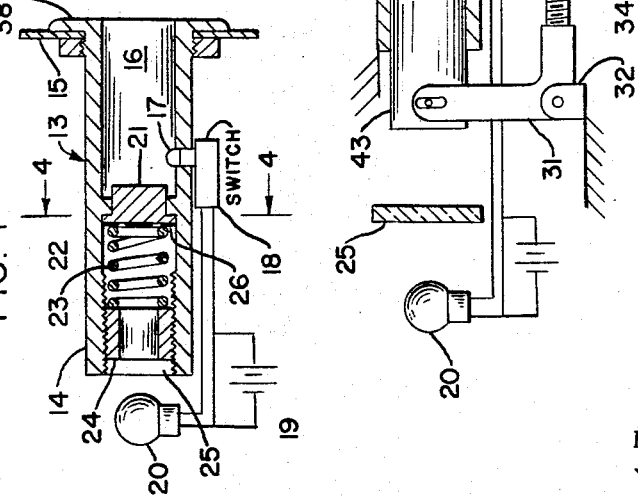
ALEXANDER E. MARTENS
INVENTOR
BY
ATTORNEY United States Patent Office 3,287,957
Patented Nov. 29, 1966

3,287,957
CALIBRATION UNIT
Alexander E. Martens, Greece, N.Y., assignor to Bausch & Lomb Incorporated, Rochester, N.Y., a corporation of New York
Filed Oct. 1, 1964, Ser. No. 400,808
8 Claims. (Cl. 73—1)

This invention relates to a tonometer and more particularly to a means for calibrating a tonometer.

Applanation tonometers measure intraocular pressure in the eyeball by flattening a predetermined area by applying a force to the probe contacting the eye. The relationship of the area flattened and the force required provides a reading of intraocular pressure within the eyeball. The operation of an applanation tonometer is more specifically described in the copending patent applications of the same assignee, Serial Nos. 378,846 and 379,123.

To maintain accurate reading of an applanation tonometer it is advistable to provide a calibration unit which will allow the operator of the tonometer to check its accuracy and correct any deviations from a predetermined standard before an eye examination. This will lessen the demands on stability and accuracy of the electronic circuitry and at the same time raise the level of confidence of the operator to insure consistently accurate test results. Accordingly this invention is to provide such a calibration unit.

It is an object of this invention to provide a calibration unit for calibrating an applanation tonometer.

It is another object of this invention to provide a calibration unit producing an image simulating the meniscus ring sensed by the applanation tonometer and to provide a predetermined force simulating normal intraocular pressure in the eyeball for calibration of the tonometer.

It is a further object of this invention to provide a luminous ring of predetermined size simulating the wavelength and size of the meniscus ring formed on the eye during applanation of a predetermined area and also provide a reaction force of predetermined magnitude on the probe to thereby provide a means of calibrating an applanation tonometer.

The objects of this invention are accomplished by providing a means for reception of the probe of the applanation tonometer. It is understood that the applanation tonometer has means for adjusting the output to the pressure indicator and the meter readout which records the intraocular pressure. The applanation tonometer has a means for controlling the width of the reference pulse from the reference pulse generator as well as the amplification of the signal from the phototube. The calibration unit generates a standard light ring simulating a meniscus ring of a predetermined diameter. An electrical signal is generated responsive to the light signal and is compared to a reference pulse of a predetermined width in a comparator. The comparator generates a lock signal and applies it to the pressure indicator when the electrical signal is of greater time duration than the width of the reference pulse from the reference pulse generator.

As the probe of the applanation tonometer is inserted into the calibration unit a switch is actuated which energizes a light producing the light ring simulating the meniscus ring formed on the eyeball. A biasing force biased the plunger to engage the end of the probe simulating the force created as the eye is applanated. With the calibration force and the calibration image the applanation tonometer is thereby calibrated to provide a predetermined readout compared to a normal intraocular pressure of the eye.

The preferred embodiments of this invention are described in the subsequent description and illustrated in the attached drawings.

FIG. 1 is a cross section view of a calibration unit using a spring for the biasing force.

FIG. 2 is a cross section view using a weight to produce the biasing force in the calibration unit.

FIG. 3 is a simplified circuit diagram of an applanation tonometer.

FIG. 4 is an enlarged view illustrating a luminous ring simulating the meniscus ring formed on the probe during normal operation.

Referring to the drawings FIG. 3 illustrates an applanation tonometer in simplified form. The applanation tonometer is more specifically described in the previously mentioned patent applications. A housing 1 supports the probe 2 which is pressed against the eye to form a predetermined flattened portion on the eye. A transducer enclosed in the housing 1 generates an electrical signal responsive to the force on the probe 2. The transducer signal is amplified by the amplifier 3. The output of the amplifier 3 is applied to the pressure indicator 4 which provides a reading in the meter 5. A portion of the output of the amplifier 3 is applied to the pressure indicator by means of the potentiometer 6. The potentiometer 6 provides an adjustment to give the desired reading for calibrating the pressure readout in accordance with intraocular pressure of the eye.

A phototube and optical scanning 7 receives a light signal responsive to the illuminated meniscus ring surrounding the flattened area on the eyeball and generates an electrical signal of a time duration responsive to the diameter of the flattened area. The electrical signal is applied to amplifier 8. The output signal from the amplifier 8 may be adjusted by the variable resistor 40. The signal is differentiated by the differentiator circuits 9 and compared by the pulse width comparator 10. The resistor 40 is adjusted for a predetermined intensity of meniscus ring to generate a lock signal in the comparator 10 to lock the pressure indicator 4.

The reference pulse generator 11 generates a pulse of a predetermined time duration which is compared in the comparator 10 with the signal from the differentiators, and a hold pulse is generated and applied to the pressure indicator as soon as the signal from the differentiators is of greater time duration than the pulse from the pulse generator. The time duration of the signal from the pulse generator is controlled by the variable resistor 12. When the signal received from the differentiators is of the desired time duration the pulse from the generator is adjusted to a slightly shorter time duration. The circuit as illustrated provides the necessary adjustment to calibrate the applanation tonometer.

FIG. 1 illustrates a calibration unit which may be used for an applanation tonometer such as described in FIG. 3. A receptacle 13 which includes sleeve 14 mounted on the housing 15 for reception of the probe 2. The probe 2 as it enters the opening 16 engages the actuator 17 of the switch 18. The source of electrical energy 19 energizes the bulb 20 as the switch 18 is actuated.

The plunger 21 is biased to the position as shown against the shoulder 22 by the spring 23. The spring 23 is seated on the externally threaded nut 24 which is threadedly received within the sleeve 14. A screw slot 25 is formed on the end of the nut and the compression of the spring 23 may be varied to change the force exerted on the plunger 21.

The light 20 illuminates a film 26 which is opaque in the areas 27 and 28 and semi-transparent in the ring 29. The blue-green light 20 illuminates the ring 29 to simulate the luminescence produced in the meniscus ring of an applanation tonometer. This signal is projected onto the probes 2 and generates a signal in the phototube of the tonometer.

The receptacle 13 of FIG. 2 is similar in operation to that of FIG. 1. The plunger 41 carries a film 42 intermediate the cylindrical portion 43 and the tip portion 30. The arm 31 is pivotally supported on the support 32. The plunger engages the shoulder 33 with a force proportional to the weight 34 on the lower end of the arm 31.

The light 20 is directed through the filter 35 to produce a blue-green light on the ring 29. The signal produced is sensed by the phototube in the applanation tonometer.

The operation of the calibration unit will be described in the following paragraphs. The probe 2 of the tonometer 36 is inserted in the receptacle 13 until the shoulder 37 of the housing 1 engages the radial flange 38. The spring is compressed between the plunger 21 and the nut 24. The tip of the probe 2 engages the tip of the plunger 21 and produces a slightly additional compression of the spring 23 as the plunger is unseated from the shoulder within sleeve 14. The force of the spring is preset at a predetermined value and the force of the spring is increased slightly in accordance with Hooke's law due to displacement of the plunger as it is unseated to produce force equal to the force exerted by normal intraocular pressure when a predetermined area of the eye is flattened. The force on the tip of the probe 2 is transmitted to a transducer in the housing 1 and generates an electrical signal responsive to the force on the end of the probe. The pressure indicator 4 receives a signal and indicates normal intraocular pressure of the eye for the predetermined force applied to the probe. If a deviation from a normal reading is shown by the pressure indicator a correction can be made by adjusting the potentiometer 6.

The spring force is preset to provide the desired force by setting the external threaded nut 24 in its proper position. The force of the calibration unit in FIG. 2 may be preset by positioning the weight 34 on the lower end of the arm 31. The device in FIG. 2 provides a more constant force on the plunger. This adjustment is preset in the factory and on rare occasions may be adjusted in the field if for any reason it may become necessary. This adjustment however, is rarely needed and the instrument might be made with no adjustment and preset to provide the predetermined force in the factory.

The applanation tonometer when operated under normal conditions applanates a portion of the eye causing a flattening of a predetermined area having a predetermined diameter. An illuminated meniscus ring is formed about the periphery of the flattened area and this ring is simulated by the semi-transparent ring 29 as illustrated in FIG. 4. The illuminated ring 29 simulates the predetermined diameter of a meniscus ring and produces a light signal which is projected into the probe 2 where an electrical signal is generated by the phototube and scanning unit in the tonometer. The electrical signal is amplified in the amplifier 8 and the output is adjusted by resistor 40 to the desired amplitude. The signal is differentiated and applied to the pulse width comparator. The pulse width comparator also receives a signal from the reference pulse generator. The reference pulse generator generates a signal of a pulse width of a predetermined time duration. Infrequently there may be a slight shift due to component drift and adjusting of parts in the circuit. Accordingly an adjustment of the variable resistor 12 is provided to overcome any errors which may creep into the circuit. The reference pulse generator is adjusted to produce a pulse having a width slightly less than that of the signal generated by scanning the simulated meniscus ring, subsequent to amplification and differentiation. When the pulse width and the pulse generated by the pulse generator 11 is so adjusted a hold signal from the pulse width comparator 10 is generated to lock the pressure indicator reading. Accordingly the tonometer is calibrated with the calibrating device providing the standard force and light signal.

The preferred embodiments of this invention have been illustrated and described and it is understood that other modifications might be devised which would fall within the scope of the attached claims which describe the invention.

I claim:

1. An applanation tonometer calibration unit comprising, a receptacle for receiving a probe of an applanation tonometer, a plunger slidably mounted in said receptacle for engaging the end of said probe, means biasing said plunger with a predetermined force against said probe, a luminous ring formed on said plunger having a predetermined diameter to thereby provide an image simulating a meniscus ring formed on said applanation tonometer when pressed against an eye with a predetermined force.

2. An applanation tonometer calibration unit for calibrating a tonometer to read intraocular pressure units when a predetermined area of the eye is flattened comprising, a receptacle for receiving a probe of an applanation tonometer, a spring biased plunger in said receptacle for engagement of the probe of a tonometer with a predetermined force, means providing an illuminated transluscent ring of a predetermined diameter and intensity projecting an image on said probe to thereby provide a standard luminous image and predetermined force for calibration of the tonometer.

3. An applanation tonometer calibration unit for calibrating an applanation tonometer comprising, a receptacle for receiving the probe of a tonometer, a spring biased plunger slidably received in said receptacle for engaging the probe of a tonometer with a predetermined force, a transluscent ring of a predetermined size formed on said plunger, illuminating means illuminating said ring for simulating the meniscus ring when an applanation tonometer normally engages the eye to thereby provide a means for adjusting the pressure readout indicator of a tonometer to a predetermined reading when a predetermined area of the eyeball is flattened.

4. An applanation tonometer calibration unit for calibrating an applanation tonometer to read intraocular pressure of an eye comprising, a receptacle for receiving the probe of a tonometer, a plunger slidably mounted in said receptacle for engaging the tip of said probe, an arm having an adjustable weight thereon for adjusting the force of the engagement of said plunger with the tip of the probe, a transluscent ring of a predetermined diameter formed by a film on said plunger, illuminating and filtering means directing a blue-green light of a predetermined intensity on said ring to thereby simulate the meniscus ring formed on said probe when said probe engages the eye during normal operation.

5. An applanation tonometer calibration unit for calibrating an applanation tonometer to read in intraocular units comprising, a receptacle for receiving the probe of a tonometer, a spring biased plunger received in said receptacle biased to engage said plunger with said probe with a predetermined force, a film having a semi-transparent portion of a predetermined diameter formed on said plunger, a switch in said receptacle engaging said probe and electrically connected to energizing means and said illuminating means to provide illumination of said ring when said probe is inserted in said receptacle and thereby provide a means to calibrate the tonometer in accordance with a ring of predetermined diameter and a force of predetermined magnitude.

6. An applanation tonometer calibration unit for calibrating an applanation tonometer comprising, a receptacle for receiving a probe of a tonometer, a plunger sildably mounted in said receptacle and biased to engage the probe with a predetermined force, a transluscent ring formed on said plunger of a predetermined diameter simulating a meniscus ring formed during normal operation, illuminating means projecting a light on said ring of a predetermined intensity and wavelength thereby projecting an image of the ring of a predetermined diameter and intensity into said probe and bias said probe with a predetermined force for calibration of the tonometer.

7. An applanation tonometer calibration unit for calibrating an applanation tonometer comprising, a receptacle for receiving the probe of the tonometer, a plunger slidably mounted in said receptacle and biased to engage the tip of a probe with a predetermined force, a light transmitting ring of a predetermined diameter formed on said plunger, illuminating means projecting light on said ring of a predetermined wavelength and intensity thereby projecting an image of the ring simulating the meniscus ring imaged in said probe during normal operation and providing a force engaging said probe for calibration of said tonometer.

8. An applanation tonometer calibration unit for calibrating an applanation tonometer comprising, a receptacle for receiving the probe of the tonometer, a plunger slidably mounted in said receptacle and biased to engage the tip of a probe with a predetermined force for calibrating the intraocular pressure of the pressure indicator in the tonometer, a light transmitting ring of a predetermined diameter formed on said plunger for calibrating the width of pulses generated by the reference pulse generator in the tonometer, illuminating means projecting light on said ring of a predetermined wavelength and intensity for adjusting the sensitivity of the photo-detector circuit in the tonometer thereby providing a means for calibrating an applanation tonometer.

References Cited by the Examiner
UNITED STATES PATENTS

| | | | |
|---|---|---|---|
| 3,049,001 | 8/1962 | Mackay | 73—80 |
| 3,070,997 | 1/1963 | Papritz | 73—80 |

LOUIS R. PRINCE, *Primary Examiner.*